United States Patent
Korson et al.

(10) Patent No.: US 9,821,780 B2
(45) Date of Patent: Nov. 21, 2017

(54) AUTOMATED DIFFERENTIAL LOCK

(71) Applicant: International Truck Intellectual Property Company, LLC, Lisle, IL (US)

(72) Inventors: James Jerome Korson, Naperville, IL (US); Grzegorz Siuchta, Des Plaines, IL (US)

(73) Assignee: International Truck Intellectual Property Company, LLC, Lisle, IL (US)

( * ) Notice: Subject to any disclaimer, the term of this patent is extended or adjusted under 35 U.S.C. 154(b) by 156 days.

(21) Appl. No.: 14/976,544

(22) Filed: Dec. 21, 2015

(65) Prior Publication Data

US 2016/0272177 A1 Sep. 22, 2016

Related U.S. Application Data

(60) Provisional application No. 62/135,507, filed on Mar. 19, 2015.

(51) Int. Cl.
*B60T 8/175* (2006.01)
*B60T 8/32* (2006.01)

(52) U.S. Cl.
CPC ............ *B60T 8/175* (2013.01); *B60T 8/3205* (2013.01); *B60T 8/3215* (2013.01); *B60T 2201/14* (2013.01); *B60T 2210/16* (2013.01)

(58) Field of Classification Search
CPC ...... B60T 8/175; B60T 8/3205; B60T 8/3215; B60T 2210/16; B60T 2201/14
USPC ........................................... 701/88
See application file for complete search history.

(56) References Cited

U.S. PATENT DOCUMENTS

2003/0051933 A1* 3/2003 Bell ................. B60C 23/002
180/170

\* cited by examiner

*Primary Examiner* — Brian P Sweeney
(74) *Attorney, Agent, or Firm* — Jeffrey P. Calfa; Mark C. Bach

(57) ABSTRACT

A differential locking axle control system that can cause the axle to automatically lock and unlock at any vehicle speed, up to a predetermined maximum speed, or any wheel spin rate up to a predetermined maximum, when a vehicle is being steered either in a straight line or around a curve while taking traction and global positioning factors into account.

15 Claims, 4 Drawing Sheets

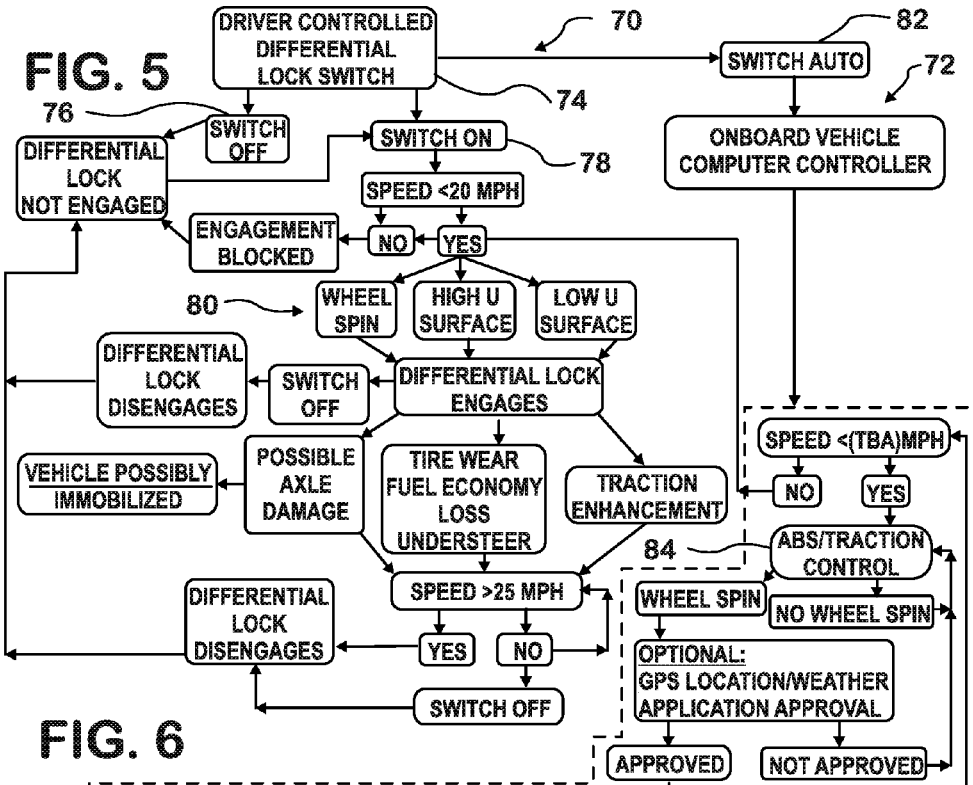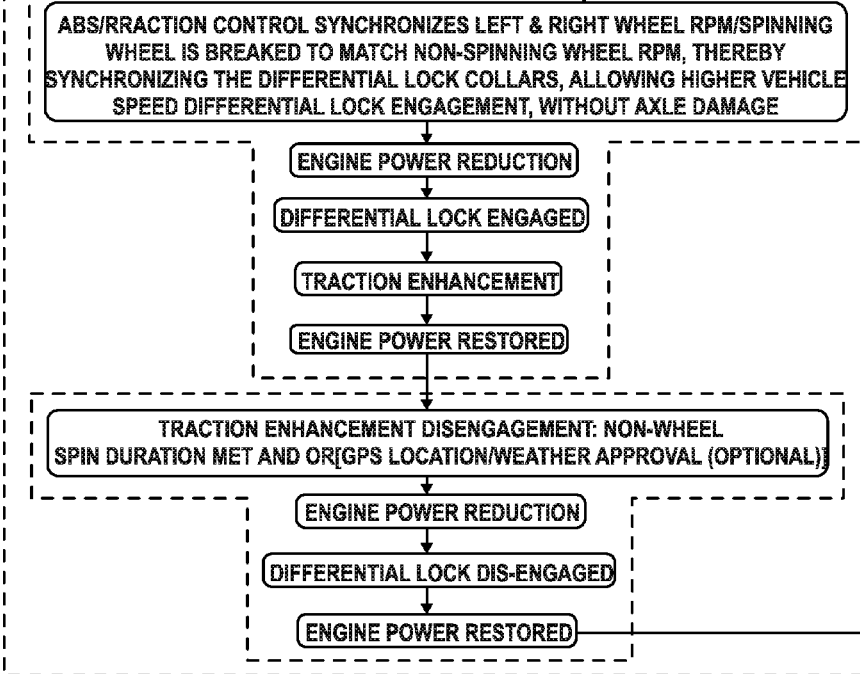

AUTOMATED DIFFERENTIAL LOCK

TECHNICAL FIELD

This disclosure relates generally to road and off-road vehicles, particularly to an automatic locking/unlocking differential drive axle of such vehicles.

BACKGROUND

A drive axle of a road or off-road vehicle typically has a differential gear mechanism which enables its right and left drive wheels to rotate at different speeds during certain conditions including steering of the vehicle along a turning radius and occurrence of a difference between traction of one drive wheel to an underlying surface and traction of the other drive wheel to an underlying surface. When a drive axle has a locking differential, it includes a locking/unlocking mechanism. When the locking/unlocking mechanism is unlocked, the differential gear mechanism operates as described. When the locking/unlocking mechanism is unlocked, the right and left axle shafts are locked together to cause the right and left drive wheels to rotate in unison and thereby disable their rotation at different speeds.

Current locking differential drive axles may be manually activated by a driver of a vehicle, and then either manually or automatically deactivated. When a driver wants to lock the differential, certain contemporaneous events such as wheel spin and steering angle of the vehicle render locking undesirable or even impossible.

For example, a driver may have to bring a vehicle to a near or complete stop in order to lock the differential, and such stopping may be hazardous in certain circumstances, such as when a vehicle is travelling on a high speed roadway or is operating off-road.

If the differential is already locked, and then prematurely unlocked, it can be re-locked only in the above manner.

Consequently, in intermittent low traction conditions, a driver must decide either to tolerate the stop/slow down engage/disengage cycle, to leave the differential unlocked and risk a low traction event, such as getting stuck or being forced to drive more slowly in order to maintain vehicle control, or to leave the differential locked for extended periods of time and risk increased tire wear and reduced driveshaft life due to equivalent left and right wheel speeds, during turning events, causing intermittent wheel slip and grip.

Two types of differential locking/unlocking systems are sometimes referred to as "mechanical coupler" and "clutch pack" ("limited-slip"). The mechanical coupler cannot be used in a wheel spin event, unless the vehicle is stopped or nearly stopped, and there has not yet been a remedy to prevent that. The clutch pack engages/disengages automatically at almost any speed, but if engaged while the vehicle is in a turn, it has a tendency to cause understeering on low friction road surfaces.

SUMMARY OF THE DISCLOSURE

The differential locking axle of the present disclosure can automatically lock and unlock at any vehicle speed, up to a predetermined maximum speed, or any wheel spin rate up to a predetermined maximum, when a vehicle is being steered either in a straight line or around a curve. That capability enhances vehicle handling by increasing longitudinal and lateral traction.

That capability is incorporated in an operational strategy of an electronic controller which is associated with an existing drive axle without, or with only little, mechanical modification, provided that the drive axle's wheels are part of an ABS traction control system. Consequently, there is little or no axle weight increase, avoiding weight penalty likely imposed by "limited slip" or "no-spin" type locking differential drive axles, which may also be more costly and prone to more frequent maintenance.

The controller allows a driver of a vehicle to use differential locking in the current manner of manual "on" and manual "off" or automatic "off", and/or or to select automatic locking/unlocking by the controller as a function of vehicle travelling speed and wheel slip.

One general aspect of this disclosure relates to a road or off-road vehicle comprising a chassis frame, a prime mover supported on the chassis frame, front steering wheels suspended from the chassis frame for steering the vehicle, and a rear drive axle suspended from the chassis frame for propelling the vehicle.

The rear drive axle comprises a right drive wheel, a left drive wheel, and an input shaft operated by the prime mover to rotate the right drive wheel through a right axle shaft and the left drive wheel through a left axle shaft, a gear mechanism for enabling one drive wheel to rotate at a speed different from that of the other drive wheel during certain conditions which include steering of the vehicle along a turning radius and occurrence of a difference between traction of one drive wheel to an underlying surface and traction of the other drive wheel to an underlying surface, and a locking/unlocking mechanism for selectively locking the right and left axle shafts together to rotate in unison and thereby disable their rotation at different speeds.

An ABS system can selectively brake each drive wheel independently of the other, and a controller can set any of multiple operating modes for controlling operation of the locking/unlocking mechanism as a function of at least travelling speed of the vehicle and a difference between speed of one drive wheel and speed of the other drive wheel occurring because of a difference in traction of each drive wheel to the respective underlying surface.

One operating mode is an automatic operating mode for causing the locking/unlocking mechanism to lock the right and left axle shafts together for rotation in unison when both travelling speed of the vehicle becomes greater than a selected speed and a difference between speed of one drive wheel and speed of the other drive wheel becomes greater than a selected limit.

The foregoing summary, accompanied by further detail of the disclosure, will be presented in the Detailed Description below with reference to the following drawings that are part of this disclosure.

BRIEF DESCRIPTION OF THE DRAWINGS

FIG. 5 is diagram showing a first portion of an operational strategy embodied in a controller associated with the differential drive axle.

FIG. 6 is diagram showing a second portion of an automatic operational differential lock/unlock strategy embodied in the controller.

DETAILED DESCRIPTION

Figure 1:
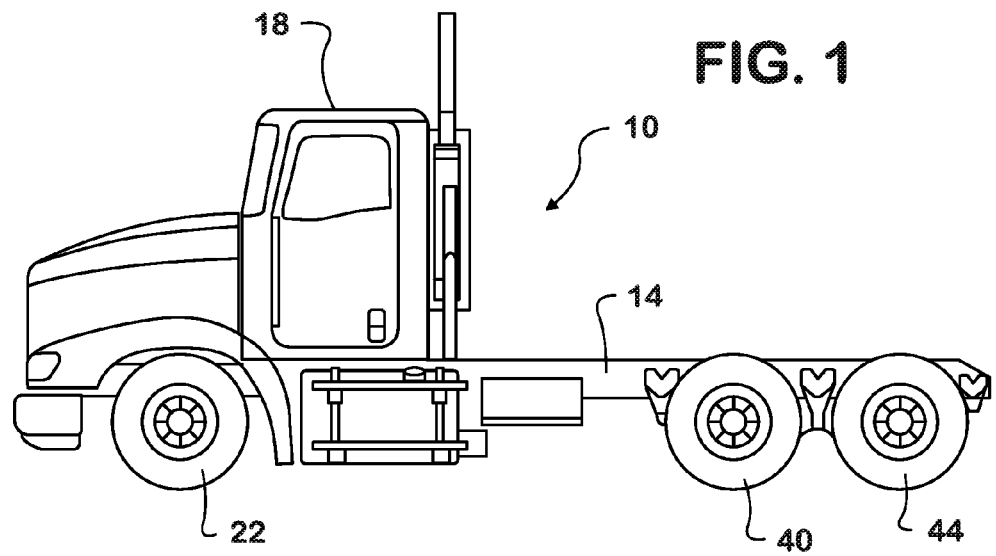
FIG. 1 is a left side elevation view of a truck vehicle.
Figure 2:
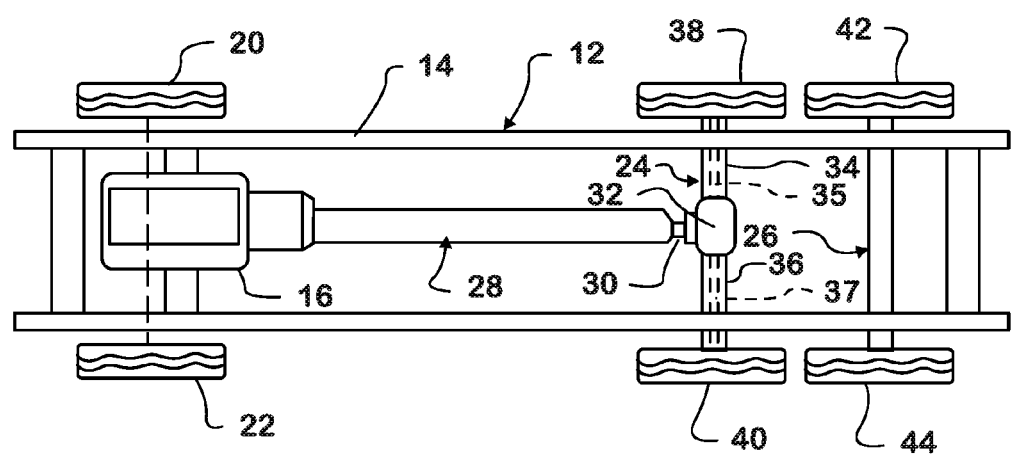
FIG. 2 is a top plan view of a chassis of the truck vehicle.

FIGS. 1 and 2 show an example of a truck vehicle 10 which comprises a chassis 12 having a chassis frame 14 on which are mounted a prime mover, such as a diesel engine, 16 and a cab 18 having an interior compartment for a driver of the truck vehicle. Right and left front steerable wheels 20, 22 respectively are suspended from chassis frame 14 on right and left sides for steering truck vehicle 10.

Front and rear tandem axles 24, 26 are suspended from chassis frame 14. Front tandem axle 24 is a locking differential drive axle and rear tandem axle 26 is a tag axle. A tag axle can be either to the rear of a drive axle (as shown) or in front of a drive axle, and the locking differential feature can apply to any number of drive axle and tag axle combinations, such as tandems, tridems, etc.

Prime mover 16 has an output shaft which is coupled through a drivetrain 28 to an input shaft 30 of drive axle 24. Drive axle 24 has a casing 32 which contains a differential gear mechanism and right and left axle tubes 34, 36 which extend laterally from casing 32. Right axle tube 34 houses a right axle shaft 35 which is coupled to a right drive wheel 38 while being supported for rotation in the axle tube. Left axle tube 36 houses a left axle shaft 37 which is coupled to a left drive wheel 40 while being supported for rotation in the axle tube. Right axle shaft 35 and left axle shaft 37 share a common axis of rotation 39, and each axle shaft is coupled to the differential gear mechanism within casing 32.

When prime mover 16 operates, torque is transmitted via drivetrain 28 to input shaft 30 to operate the differential gear mechanism and rotate right drive wheel 38 through right axle shaft 35 and left drive wheel 40 through left axle shaft 37 to enable drive wheels 38, 40 to rotate at different speeds during certain conditions including steering of truck vehicle 10 along a turning radius and occurrence of a difference between traction of one drive wheel to an underlying surface and traction of the other drive wheel to an underlying surface.

Tag axle 26 is not a drive axle. It has right and left wheels 42, 44 which can rotate independently of each other.

The differential gear mechanism within casing 32 is essentially conventional. It may comprise, by way of example as in FIGS. 3 and 4, a ring gear 49 which is supported for rotation in casing 32 about the common axis 39 of right and left axle shafts 35, 37. It may further comprise a left side axle shaft gear 41 which rotates with left axle shaft 37, a right side axle shaft gear 43 which rotates with right axle shaft 35, and differential spider gears 54 supported for independent rotation on opposite sides of a carrier 45 to which ring gear 49 is affixed. The two axle shaft side gears 41, 43 can rotate via their own respective bearings on carrier 45 about the common axis 39 of right and left axle shafts 35, 37. Rotation of input shaft 30 rotates ring gear 49 including carrier 45. Rotation of ring gear 49 is imparted to the respective side axle shaft gears 41, 43 because spider gears 54 are in mesh with both side axle shaft gears 41, 43. Right and left axle shafts 35, 37 will rotate at equal speeds when truck vehicle 10 is being steered in a straight line, but the differential gear mechanism will allow one axle shaft to rotate at a slower speed than the other when the vehicle is being steered to turn in the direction of the slower rotating axle shaft.

Figure 3:
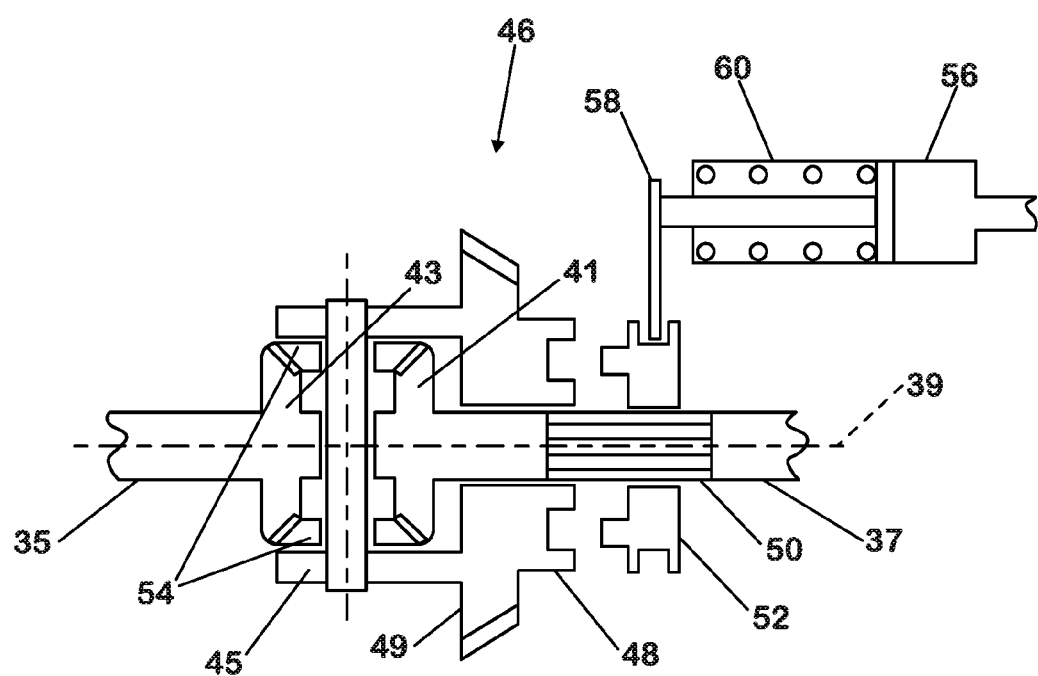
FIG. 3 is fragmentary view of a portion of a differential drive axle of the truck vehicle showing unlocked (disengaged) condition.
Figure 4:
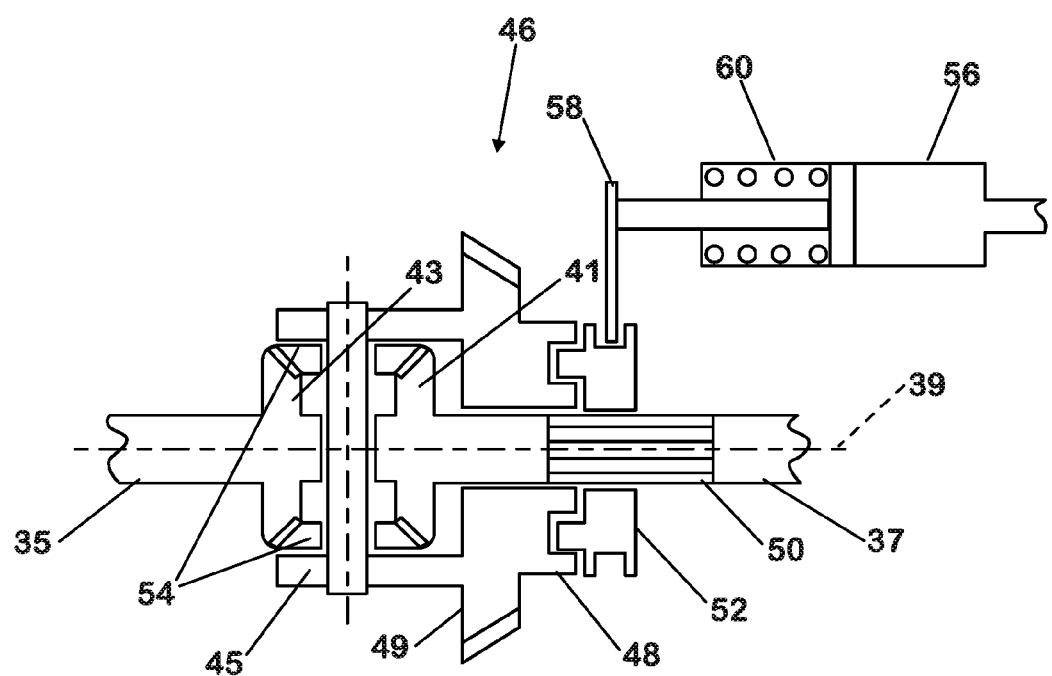
FIG. 4 is a view like FIG. 3 showing locked (engaged) condition.

FIGS. 3 and 4 show a locking/unlocking mechanism 46 for selectively locking right and left axle shafts 35, 37 together to rotate in unison and thereby disable their rotation at different speeds. In the locking/unlocking mechanism's unlocked condition shown in FIG. 3, each axle shaft 35, 37 can rotate independently of the other. In the locked condition of FIG. 4, the two axle shafts 35, 37 are locked together to rotate in unison.

A toothed right dog clutch gear 48 is rigidly connected to carrier 45 and ring gear 49. A toothed left dog clutch gear 52 rotates in unison with left axle shaft 37 via a spline connection 50 which also enables left dog clutch gear 52 to slide along left axle shaft 37. In the locked condition of FIG. 4, toothed left dog clutch gear 52 has been slid along left axle shaft 37 from the unlocked condition of FIG. 3 to mesh with external teeth on right dog clutch gear 48, causing left axle shaft 37, ring gear 49, and differential carrier 45 to rotate in unison. This effectively locks spider gears 54 against turning and therefore locks right and left axle shafts 35, 37 together so that they rotate in unison.

Locking/unlocking mechanism 46 comprises an actuator 56 for operating a shift fork 58 to shift left dog clutch gear 52 lengthwise along left axle shaft 37 into and out of engagement with right dog clutch gear 48.

Actuator 56 can be any of various types, such as one which is actuated by pneumatic pressure to move shift fork 58 from the FIG. 3 unlocked position to the FIG. 4 locked position against the force of a compression spring 60. When pneumatic pressure to actuator 56 is removed, spring 60 forces shift fork 58 back to the FIG. 3 position.

All wheels of truck vehicle 10 comprise pneumatic tires through each of which the respective wheel has contact with an underlying surface. Truck vehicle 10 also comprises an ABS traction control system (anti-lock brake system) 84 (FIG. 6) which includes an associated controller for controlling wheel braking on an individual wheel basis. In truck vehicle 10, the ABS system includes at least right and left drive wheels 38, 40.

FIGS. 5 and 6 show an operational strategy embodied in a controller associated with locking/unlocking differential drive axle 24. The controller may be a powertrain or engine controller which controls various aspects of the prime mover and drivetrain. FIG. 5 shows a first portion 70 of the strategy, and FIG. 6 a second portion 72. The strategy can set any of multiple operating modes for controlling operation of locking/unlocking mechanism 46 as a function of at least travelling speed of truck vehicle 10 and a difference between speeds of right and left drive wheels 38 and 40, which occurs because of a difference in traction of the tire of each drive wheel to the respective underlying surface with which it is in surface-to-surface contact.

First portion 70 includes a selector switch 74 which is selectively operable by a driver of truck vehicle 10 either to select a first operating mode for the controller to the exclusion of a second operating mode for the controller or to select the second operating mode to the exclusion of the first operating mode.

The first operating mode, represented by the function "switch off" 76, is effective to prevent locking/unlocking mechanism 46 from locking right and left axle shafts 35, 37 together, and hence drive wheels 38 and 40 also, regardless of truck vehicle speed.

The second operating mode, represented by the function "switch on" 78, is effective to enable locking/unlocking mechanism 46 to lock right and left axle shafts 35, 37 together, and hence drive wheels 38 and 40 also, for rotation in unison when travelling speed of truck vehicle 10 is less than a first speed (for example 20 MPH as shown), and when travelling speed of the truck vehicle increases to a second speed greater than the first speed (for example 25 MPH as shown), to unlock right and left axle shafts 35, 37 from each other and enable drive wheels 38, 40 to rotate at different speeds. Actual engagement may be conditioned on factors 80 like wheel spin and road surface friction meeting certain driver determined conditions. When axle shafts 35, 37 are locked and vehicle speed is less than the second speed, they may be unlocked simply by turning selector switch 74 off.

Second portion 72 comprises an automatic mode enable switch 82 which is operable to enable a third operating mode for the controller. The third operating mode causes locking/unlocking mechanism 46 to lock right and left axle shafts 35, 37 together for rotation in unison, and hence drive wheels 38 and 40 also, when both travelling speed of truck vehicle 10 becomes greater than a selected speed and a difference between speeds of drive wheels 38, 40 becomes greater than a selected limit.

When the third operating mode is enabled and the conditions just mentioned are satisfied, the controller causes ABS traction control system 84 to decelerate at least one of the drive wheels 38, 40 to bring the speeds of both drive wheels to speeds within a selected range of each other before the controller causes locking/unlocking mechanism 46 to lock right and left axle shafts 35, 37 together for rotation in unison.

The controller need not necessarily cause ABS traction control system 84 to decelerate both drive wheels 38, 40. For example, only the one drive wheel whose speed is greater than that of the other drive wheel may be decelerated to bring the speeds of both drive wheels to speeds within the selected range before the controller causes locking/unlocking mechanism 46 to lock right and left axle shafts 35, 37 together.

The controller may also condition locking and unlocking of locking/unlocking mechanism 46 on satisfaction of at least one condition. FIG. 6 shows that the controller: conditions unlocking of locking/unlocking mechanism 46 on elapse of a selected interval of time during which drive wheels 38, 40 have been locked together for rotation in unison; conditions locking and unlocking of locking/unlocking mechanism 46 on the geographic location of the vehicle; conditions locking and unlocking of locking/unlocking mechanism 46 on a characteristic of the surface underlying at least one of drive wheels 38, 40; causes output torque of prime mover 16 to decrease before causing locking or unlocking of locking/unlocking mechanism 46; and causes output torque of prime mover 16 to increase after causing locking or unlocking of locking/unlocking mechanism 46.

What is claimed is:

1. A road or off-road vehicle comprising a chassis frame, a prime mover supported on the chassis frame, front steering wheels suspended from the chassis frame for steering the vehicle, and a rear drive axle suspended from the chassis frame for propelling the vehicle, the rear drive axle comprising a right drive wheel, a left drive wheel, and an input shaft operated by the prime mover to rotate the right drive wheel through a right axle shaft and the left drive wheel through a left axle shaft, a gear mechanism for enabling one drive wheel to rotate at a speed different from that of the other drive wheel during certain conditions which include steering of the vehicle along a turning radius and occurrence of a difference between traction of one drive wheel to an underlying surface and traction of the other drive wheel to an underlying surface, and a locking/unlocking mechanism for selectively locking the right and left axle shafts together to rotate in unison and thereby disable their rotation at different speeds, an ABS system for selectively braking each drive wheel independently of the other, a controller for setting any of multiple operating modes for controlling operation of the locking/unlocking mechanism as a function of at least travelling speed of the vehicle and a difference between speed of one drive wheel and speed of the other drive wheel occurring because of a difference in traction of each drive wheel to the respective underlying surface, a selector switch selectively operable either to select a first operating mode for the controller to the exclusion of a second operating mode for the controller or to select the second operating mode to the exclusion of the first operating mode, the second operating mode being effective to enable the locking/unlocking mechanism to lock the right and left axle shafts together for rotation in unison when travelling speed of the vehicle is less than a first speed and when travelling speed of the vehicle increases to a second speed greater than the first speed, to unlock the right and left axle shafts from each other and enable each drive wheel to rotate at a speed different from that of the other, the first operating mode being effective to prevent the locking/unlocking mechanism from locking the right and left axle shafts together for rotation in unison regardless of the travelling speed of the vehicle, and an automatic mode enable switch which is operable to enable a third operating mode for the controller, the third operating mode causing the locking/unlocking mechanism to lock the right and left axle shafts together for rotation in unison when both travelling speed of the vehicle becomes greater than a selected speed and a difference between speed of one drive wheel and speed of the other drive wheel becomes greater than a selected limit, in which the controller, when the third operating mode is enabled, causes the ABS system to decelerate at least one of the drive wheels to bring the speeds of both drive wheels to speeds within a selected range of each other before the controller causes the locking/unlocking mechanism to lock the right and left axle shafts together for rotation in unison.

2. The road or off-road vehicle as set forth in claim 1 in which the controller, when the third operating mode is enabled, causes the ABS system to decelerate only one drive wheel whose speed is greater than that of the other drive wheel to bring the speeds of both drive wheels to speeds within a selected range of each other before the controller causes the locking/unlocking mechanism to lock the right and left axle shafts together for rotation in unison.

3. The road or off-road vehicle as set forth in claim 2 in which the controller, when the third operating mode is enabled and the speeds of both drive wheels are within the selected range of each other, causes output torque of the prime mover to decrease before the controller causes the locking/unlocking mechanism to lock the right and left axle shafts together for rotation in unison.

4. The road or off-road vehicle as set forth in claim 3 in which after the locking/unlocking mechanism has locked the right and left axle shafts together for rotation in unison, the controller causes output torque of the prime mover to increase.

5. The road or off-road vehicle as set forth in claim 2 in the controller conditions locking and unlocking of the locking/unlocking mechanism on satisfaction of at least one condition.

6. The road or off-road vehicle as set forth in claim 5 in which the controller conditions unlocking of the locking/unlocking mechanism on elapse of a selected interval of time during which the locking/unlocking mechanism has been locked.

7. The road or off-road vehicle as set forth in claim 5 in which the controller conditions locking and unlocking of the locking/unlocking mechanism on the geographic location of the vehicle.

8. The road or off-road vehicle as set forth in claim 5 in which the controller conditions locking and unlocking of the locking/unlocking mechanism on a characteristic of the surface underlying at least one of the drive wheels.

9. The road or off-road vehicle as set forth in claim 5 in which the controller causes output torque of the prime mover to decrease before causing unlocking of the locking/unlocking mechanism.

10. The road or off-road vehicle as set forth in claim 9 in which the controller causes output torque of the prime mover to increase after causing unlocking of the locking/unlocking mechanism.

11. A road or off-road vehicle comprising a chassis frame, a prime mover supported on the chassis frame, front steering wheels suspended from the chassis frame for steering the vehicle, and a rear drive axle suspended from the chassis frame for propelling the vehicle,
   the rear drive axle comprising a right drive wheel, a left drive wheel, and an input shaft operated by the prime mover to rotate the right drive wheel through a right axle shaft and the left drive wheel through a left axle shaft, a gear mechanism for enabling each drive wheel to rotate at a speed different from that of the other drive wheel during certain conditions which include steering of the vehicle along a turning radius and occurrence of a difference between traction of one drive wheel to an underlying surface and traction of the other drive wheel to an underlying surface, and a locking/unlocking mechanism for selectively locking the right and left axle shafts together to rotate in unison and thereby disable their rotation at different speeds,
   an ABS system for selectively braking each drive wheel independently of the other,
   a controller having an automatic operating mode for causing the locking/unlocking mechanism to lock the right and left axle shafts together for rotation in unison when both travelling speed of the vehicle becomes greater than a selected speed and a difference between speed of one drive wheel and speed of the other drive wheel becomes greater than a selected limit, and
   an enable switch which is operable to enable the automatic operating mode for the controller,
   in which the controller causes the ABS system to decelerate at least one of the drive wheels to bring the speeds of both drive wheels to speeds within a selected range of each other before the controller causes the locking/unlocking mechanism to lock the right and left axle shafts together for rotation in unison.

12. The road or off-road vehicle as set forth in claim 11 in which the controller, when the speeds of both drive wheels are within the selected range of each other, causes output torque of the prime mover to decrease before the controller causes the locking/unlocking mechanism to lock the right and left axle shafts together for rotation in unison, and after the locking/unlocking mechanism has locked the right and left axle shafts together for rotation in unison, the controller causes output torque of the prime mover to increase.

13. The road or off-road vehicle as set forth in claim 12 in which after the locking/unlocking mechanism has locked the right and left axle shafts together for rotation in unison, the controller conditions unlocking of the locking/unlocking mechanism on satisfaction of at least one condition.

14. The road or off-road vehicle as set forth in claim 13 in which the controller conditions unlocking of the locking/unlocking mechanism on at least one of: a) elapse of a selected interval of time during which the axle shafts have been locked together for rotation in unison; b) the geographic location of the vehicle; and c) a characteristic of the surface underlying at least one of the drive wheels.

15. The road or off-road vehicle as set forth in claim 14 in which the controller causes output torque of the prime mover to decrease after satisfaction of the at least one condition before causing unlocking of the locking/unlocking mechanism and causes output torque of the prime mover to increase after causing unlocking of the locking/unlocking mechanism.

* * * * *

UNITED STATES PATENT AND TRADEMARK OFFICE
CERTIFICATE OF CORRECTION

PATENT NO.         : 9,821,780 B2
APPLICATION NO.    : 14/976544
DATED              : November 21, 2017
INVENTOR(S)        : James Jerome Korson and Grzegorz Siuchta Page 1 of 1

It is certified that error appears in the above-identified patent and that said Letters Patent is hereby corrected as shown below:

In the Specification

Column 1, Line 2, insert:
--U.S. GOVERNMENT RIGHTS
This invention was made with U.S. Government support under DE-EE0003303 awarded by The U.S. Department of Energy. The U.S. Government has certain rights in this invention--

Signed and Sealed this
Second Day of October, 2018

Andrei Iancu
*Director of the United States Patent and Trademark Office*